United States Patent
Su et al.

(10) Patent No.: US 11,225,113 B2
(45) Date of Patent: Jan. 18, 2022

(54) UNIQUE ID ELECTRONIC TAG FOR TIRE

(71) Applicant: MUTUAL-PAK TECHNOLOGY CO., LTD., Taoyuan County (TW)

(72) Inventors: Pi Sung Su, Taoyuan County (TW); Hsin Cheng Pao, Taoyuan County (TW); Yun-Da Jung, Taoyuan County (TW); Chi Chun Hsieh, Taoyuan County (TW)

(73) Assignee: MUTUAL-PAK TECHNOLOGY CO., LTD., Taoyuan (TW)

( * ) Notice: Subject to any disclaimer, the term of this patent is extended or adjusted under 35 U.S.C. 154(b) by 137 days.

(21) Appl. No.: 16/657,106

(22) Filed: Oct. 18, 2019

(65) Prior Publication Data
US 2020/0122533 A1 Apr. 23, 2020

(30) Foreign Application Priority Data
Oct. 19, 2018 (TW) .................. 107137007

(51) Int. Cl.
*B60C 25/00* (2006.01)
*B60C 99/00* (2006.01)
*B60C 19/00* (2006.01)

(52) U.S. Cl.
CPC .............. *B60C 99/00* (2013.01); *B60C 25/00* (2013.01); *B60C 2019/004* (2013.01)

(58) Field of Classification Search
CPC .. G01M 17/02; G01M 17/021; G01M 17/022; G01M 17/027; G01M 17/025; G01M 17/024; G01M 17/10; G01M 1/045; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; G01M 7/08; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041;
(Continued)

(56) References Cited

U.S. PATENT DOCUMENTS 10,486,477 B2 * 11/2019 Balnis ................. C08L 9/00
2002/0174925 A1 * 11/2002 Wilson ................ B60C 23/04
152/415
(Continued)

FOREIGN PATENT DOCUMENTS

WO    WO-2005021292 A1 *  3/2005  ............. G06K 19/02

*Primary Examiner* — Andre J Allen
(74) *Attorney, Agent, or Firm* — Muncy, Geissler, Olds & Lowe, P.C.

(57) ABSTRACT

The present invention provides an unique ID electronic (UID) tag for a tire, which is suitable to be mounted on a surface of tire or embedded in a tire, comprising: a tag unit; a pliable protective layer; and a vulcanizable bonding layer. The pliable protective layer provided on two opposite sides of the tag unit. The vulcanizable bonding layer provided on one or each of the two opposite sides of the pliable protective layer to bond the UID tag tightly to the tire during a vulcanization process. Further, the tag unit comprises a circuit substrate provided with an antenna circuit, and an integrated circuit (IC) chip electrically connected to the antenna circuit.

17 Claims, 8 Drawing Sheets

(58) Field of Classification Search
CPC ..... B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

USPC .................................................. 73/146–146.8

See application file for complete search history.

(56) References Cited

U.S. PATENT DOCUMENTS

| | | | |
|---|---|---|---|
| 2008/0020516 A1* | 1/2008 | Kawai | B60C 23/0493 438/118 |
| 2010/0123585 A1* | 5/2010 | Fenkanyn | B60C 23/041 340/572.8 |
| 2018/0080795 A1* | 3/2018 | Roy | H01Q 1/2216 |
| 2020/0070598 A1* | 3/2020 | Noel | H01Q 11/08 |
| 2021/0019590 A1* | 1/2021 | Destraves | B60C 23/0479 |
| 2021/0098858 A1* | 4/2021 | Destraves | H01Q 9/16 |

* cited by examiner

UNIQUE ID ELECTRONIC TAG FOR TIRE

BACKGROUND OF THE INVENTION

1. Technical Field

The present invention relates to an UID tag for a tire. More particularly, the invention relates to an UID tag configured for a tire and capable of withstanding the vulcanization process and the aging tests of the tire.

2. Description of Related Art

Tires are used to bear the gross weight of a vehicle and provide traction between the vehicle and the road so that the vehicle can run under the driver's control. Basically, a tire is a rubber covering fitted around the rim of a wheel. The strength, elasticity, and toughness of rubber enable a tire to resist vibrations and forces transmitted from the road surface, to dampen the impact on a vehicle, to protect the components of a vehicle from damage attributable to a bumpy road, to adapt to high-speed driving, and to reduce noise.

From the perspective of future tire suppliers, the functions of tires must be expanded to include those supported by information technology, such as functions related to product traceability, aftersales services, recycling (both identification and traceability, with a view to preventing improper remanufacture of waste tires), and the prevention and investigation of major traffic accidents. To achieve this end, a tire must include an unique ID electronic tag (so called UID tag) as one of its components. The UID tag of a tire should be so designed that it cannot be easily removed, or peeled away, from the tire and will not fall off on its own. Moreover, the aforesaid expanded applications require the UID tag of a tire to be implanted or half-implanted into the tire during the tire manufacturing process. It follows that an UID tag must be able to resist the vulcanization environment of the tire manufacturing process and pass tire aging tests in order to be approved for use in a tire.

BRIEF SUMMARY OF THE INVENTION

The objective of the present invention is to provide an electronic tag for a tire, wherein the electronic tag can withstand vulcanization in the tire manufacturing process and endure tire aging tests.

To achieve the above goal, the present invention provides an UID tag for a tire, comprising a tag unit, a pliable protective layer, and a vulcanizable bonding layer. The pliable protective layer is provided on two opposite sides of the tag unit. The vulcanizable bonding layer is provided on one or each of the two opposite sides of the pliable protective layer to bond the UID tag tightly to the tire during a vulcanization process. The tag unit comprises a circuit substrate provided with an antenna circuit, and an integrated circuit (IC) chip electrically connected to the antenna circuit.

Further, the tag unit is provided with at least two partially overlapping signal amplification plates on one side.

Further, the signal amplification plate has a long arm and a short arm that constitute a square hook shape; and, the two signal amplification plates are arranged in a bilateral configuration like the form of mirror images of each other, with one long arm stacked one the other.

Further, the signal amplification plate is in the shape of a plate, a knitted web, a mesh, or a line.

Further, the tag unit is provided with a signal amplification plate on one side.

Further, the signal amplification plate is in the shape of a knitted web, a mesh, or a line.

Further, the signal amplification plate is 50 μm to 200 μm thick.

Further, the signal amplification plate may be a metal plate or composite plate formed by weaving metal threads, etching (to form the desired circuit), cutting a metal sheet, coating a plastic substrate with silver paste, or electroplating or electrolessly plating a substrate.

Further, the circuit substrate is disc-shaped or rectangular.

Further, one side of the vulcanizable bonding layer is provided with a positioning adhesive layer at each of two opposite ends so that the tag unit can be attached to a predetermined bonding position on a tire via the positioning adhesive layers.

To achieve the above objective, the present invention additionally provides an UID tag for a tire, comprising a tag unit, a pliable protective layer, and a vulcanizable bonding layer. The pliable protective layer is provided on two opposite sides of the tag unit. The vulcanizable bonding layer is provided on one or each of the two opposite sides of the pliable protective layer to bond the UID tag tightly to the tire during a vulcanization process. The tag unit includes a flexible circuit substrate on which an antenna circuit is provided, a chip package electrically connected to the antenna circuit, and a circuit protection layer provided on one side of the flexible circuit substrate and one side of the chip package, respectively.

Further, the tag unit is provided with at least two partially overlapping signal amplification plates on one side.

Further, the signal amplification plate has a long arm and a short arm that constitute a square hook shape; and, the two signal amplification plates are arranged in a bilateral configuration like the form of mirror images of each other, with one long arm stacked one the other.

Further, the signal amplification plate is in the shape of a plate, a knitted web, a mesh, or a line.

Further, the tag unit is provided with a signal amplification plate on one side.

Further, the signal amplification plate is in the shape of a knitted web, a mesh, or a line.

Further, the signal amplification plate is 50 μm to 200 pm thick.

Further, the signal amplification plate may be a metal plate or composite plate formed by weaving metal threads, etching (to form the desired circuit), cutting a metal sheet, coating a plastic substrate with silver paste, or electroplating or electrolessly plating a substrate.

Further, one side of the vulcanizable bonding layer is provided with a positioning adhesive layer at each of two opposite ends so that the tag unit can be attached to a predetermined bonding position on a tire via the positioning adhesive layers.

Compared with the prior art, the present invention has advantages as follows:

The UID tag for a tire of the present invention can resist the vulcanization process of the tire manufacturing process and the tire aging tests.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are restrictive of the present invention.

Figure 1:
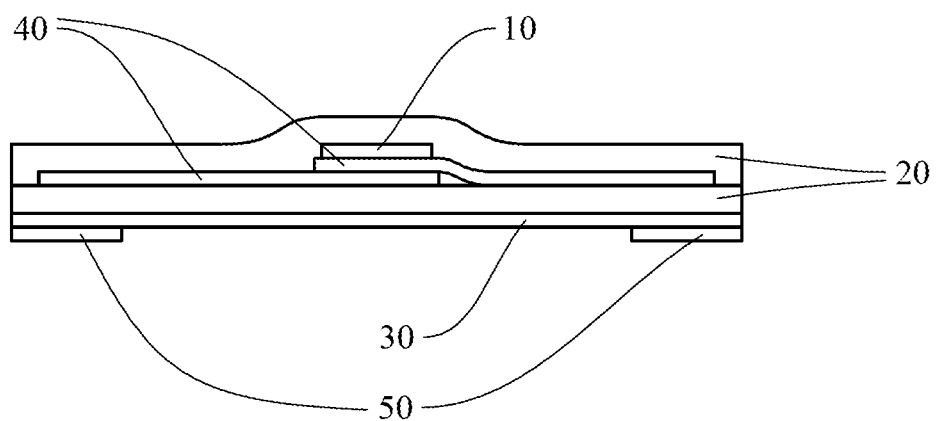
FIG. 1 is a side view of the UID tag for a tire according to the first embodiment of the present invention.
Figure 2:
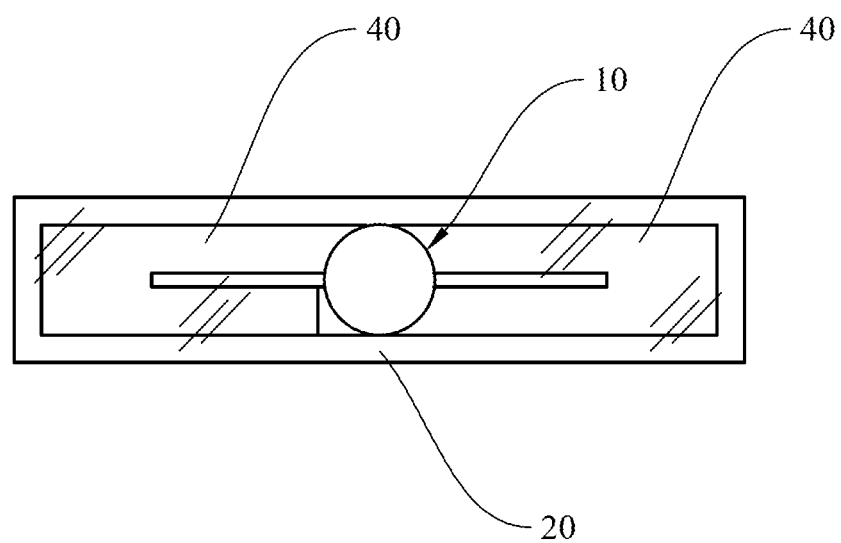
FIG. 2 is a top view of the UID tag in FIG. 1.

Please refer to FIG. 1 and FIG. 2 respectively for a side view and a top view of the electronic tag for a tire according to the first embodiment of the present invention.

The embodiment shown in FIG. 1 and FIG. 2 discloses an UID tag 100 for a tire. The UID tag 100 can survive the environment of a vulcanization process whose temperature is not lower than 200° C. and whose pressure is not lower than 12 MPa. The UID tag 100 includes a tag unit 10, a pliable protective layer 20, a vulcanizable bonding layer 30, a signal amplification plate 40, and a positioning adhesive layer 50.

Figure 3:
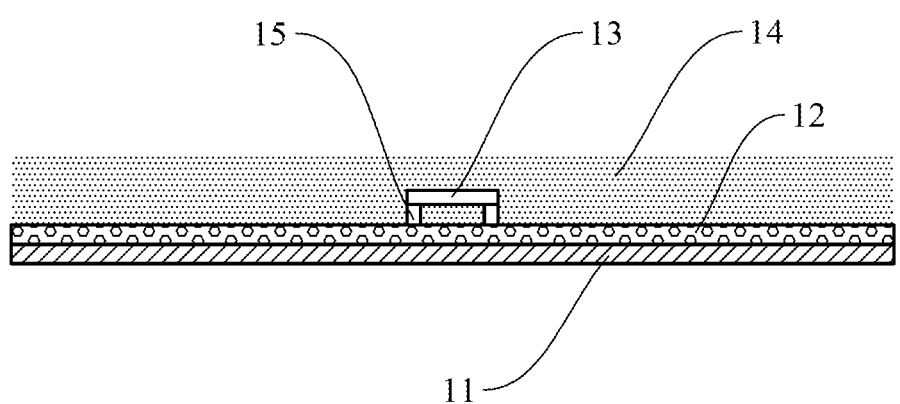
FIG. 3 is a side view of the first embodiment of the tag unit of the invention.

Please refer also to FIG. 3, which is a side view of the first embodiment of the tag unit of the present invention.

As shown in FIG. 3, the tag unit 10 includes a circuit substrate 11 on which an antenna circuit 12 is provided, and an integrated circuit (IC) chip 13 electrically connected to the antenna circuit 12. The antenna circuit 12 and the IC chip 13 are packaged on the circuit substrate 11 via an encapsulant 14. In a preferred embodiment, the IC chip 13 is provided with a metal block 15 on one side, and the metal block 15 is soldered in place to provide electrical connection between the IC chip 13 and the antenna circuit 12. In a preferred embodiment, the circuit substrate 11 is disc-shaped or rectangular, with a reduced load-bearing area to lower the chance of breakage under an excessively large external force. The antenna circuit 12 is a loop antenna configured to match the properties of the IC chip 13 on the circuit substrate 11 (be it disc-shaped, rectangular, or otherwise) in the optimal manner so as to have enhanced sensitivity in signal reception. The encapsulant 14 may be a thermosetting adhesive, an ultraviolet (UV)-curable adhesive, or a resin. The encapsulant 14 adds to the strength of the IC chip 13 and the antenna circuit 12 by dampening any external force that acts directly on the IC chip 13 and the antenna circuit 12.

The pliable protective layer 20 is provided on two opposite sides of the tag unit 10 to cover and thereby protect the tag unit 10. The pliable protective layer 20 may be a thermosetting polyimide or polyetherimide film or other electrically insulating materials that are resistant to high temperatures, acids, bases, and radiation. In a preferred embodiment, the pliable protective layer 20 has a thickness ranging from 1 mil to 5 mil.

The vulcanizable bonding layer 30 is provided on one or each of two opposite sides of the pliable protective layer 20 and can bond the tag unit 10 tightly to a tire through a vulcanization process. The vulcanizable bonding layer 30 is a material capable of a catalytic addition reaction, UV reaction, or condensation reaction to solve the problem that two totally different materials, namely the pliable protective layer 20 and a tire, cannot be bonded together with ease.

Figure 4:
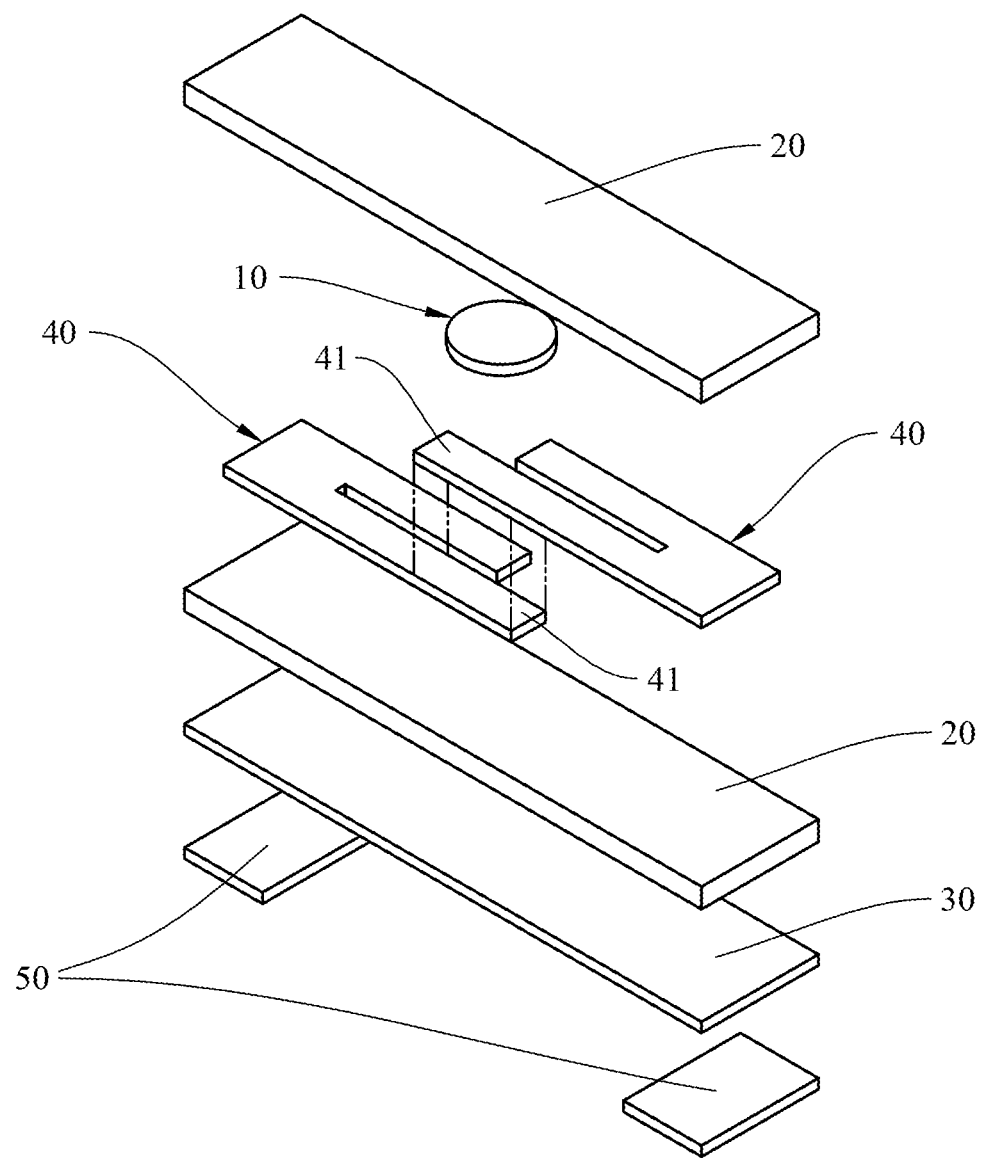
FIG. 4 is an exploded view of the UID tag in FIG. 1.

Please refer also to FIG. 4, which is an exploded view of the UID tag according to the first embodiment of the present invention.

In the preferred embodiment shown in FIG. 4, the tag unit 10 is provided with at least two partially overlapping signal amplification plates 40 on one side. The signal amplification plates 40 may be provided on either side (i.e., the upper or lower side) of the antenna circuit 12 of the tag unit 10; the relative positions of the signal amplification plates 40 and the antenna circuit 12 have no influence on the performance of the antenna circuit 12 in reading signals. The signal amplification plates 40 are designed according to the resonance frequency of the antenna so as to couple with signals of the antenna circuit 12 and amplify the signals by backscattering.

Each signal amplification plate 40 has a long arm 41 and a short arm that constitute a square hook shape. The two signal amplification plates 40 are arranged in a bilateral configuration like the form of mirror images of each other; with one long arm 41 stacked on the other. By reducing the overall length of each signal amplification plate 40, the chance of breaking the signal amplification plates 40 can be lowered to help the signal amplification plates 40 endure the vulcanization environment. Apart from the square hook shape disclosed herein, each signal amplification plate 40 may be shaped as a hollow square or the letter L instead; the present invention has no limitation in this regard. Furthermore, it is not required that there be two signal amplification plates 40 as shown in FIG. 4; more than two multilayer structures may be provided as the signal amplification plates. The present invention has no limitation on the number or configuration of the signal amplification plates. In a preferred embodiment, each signal amplification plate 40 is in the shape of a plate, a knitted web, a mesh, or a line.

In another preferred embodiment, the tag unit 10 is provided with a signal amplification plate 40 on one side, wherein the signal amplification plate 40 is in the shape of a knitted web, a mesh, or a line. This signal amplification plate 40 may be provided on either side (i.e., the upper or lower side) of the antenna circuit 12 of the tag unit 10; the relative positions of the signal amplification plate 40 and the antenna circuit 12 have no influence on the performance of the antenna circuit 12 in reading signals.

The (or each) signal amplification plate 40 in the foregoing embodiments is 50 μm to 200 μm thick to provide the tag unit 10 with the rigidity required to resist an external force. In addition, the (or each) signal amplification plate 40 is made of a material that is highly resistant to corrosion and heat and has satisfactory low-temperature strength, mechanical properties, and hot-workability, such as stainless steel, a copper-nickel-zinc alloy, or tinplate. In a preferred embodiment, the signal amplification plates 40 are SUS 304-grade metal plates. The (or each) signal amplification plate 40 in the foregoing embodiments may be a metal plate or composite plate formed by weaving metal threads, etching (to form the desired circuit), cutting a sheet of metal, coating a plastic substrate with silver paste, or electroplating or electrolessly plating a substrate. The present invention has no limitation on the material or manufacturing method of the signal amplification plate(s) 40.

One side of the vulcanizable bonding layer 30 is provided with a positioning adhesive layer 50 at each of two opposite ends so that the tag unit 10 can be properly positioned, or adhesively attached to a predetermined bonding position, on a tire via the positioning adhesive layers 50 before the bonding operation takes place. This pre-positioning process makes it easier to bond the tag unit 10 to the tire.

Figure 5:
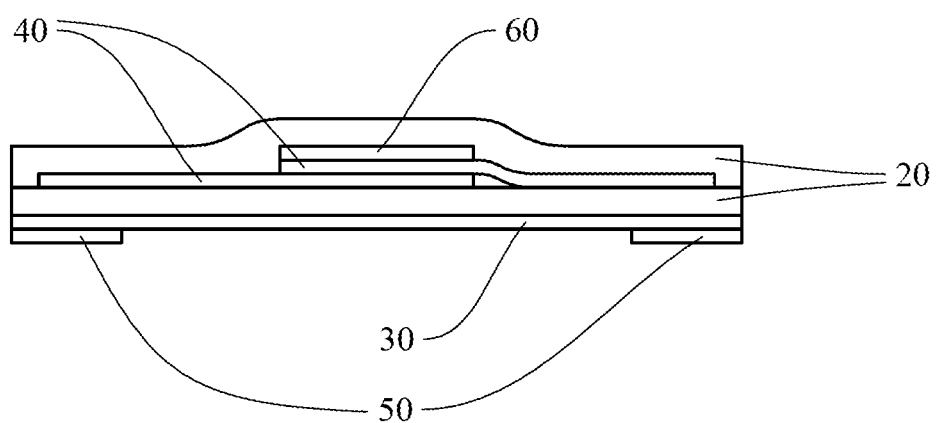
FIG. 5 is a side view of the UID tag for a tire according to the second embodiment of the invention.
Figure 6:
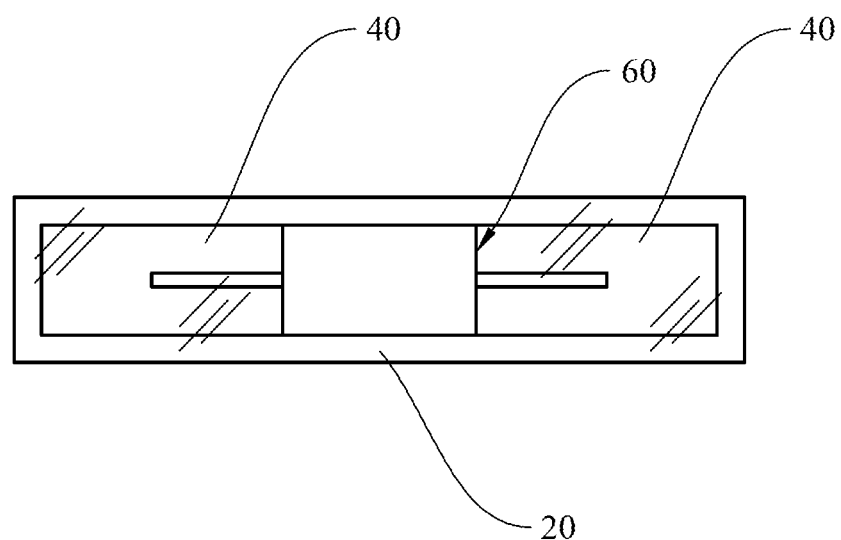
FIG. 6 is a top view of the UID tag in FIG. 5.

Please refer to FIG. 5 and FIG. 6 respectively for a side view and a top view of the UID tag for a tire according to the second embodiment of the present invention.

The embodiment shown in FIG. 5 and FIG. 6 discloses an UID tag 200 for a tire. The UID tag 200 is adapted for use in the environment of a tire vulcanization process whose temperature is not lower than 200° C. and whose pressure is not lower than 12 MPa. The UID tag 200 includes a tag unit 60, a pliable protective layer 20, a vulcanizable bonding layer 30, a signal amplification plate 40, and a positioning adhesive layer 50.

Figure 7:
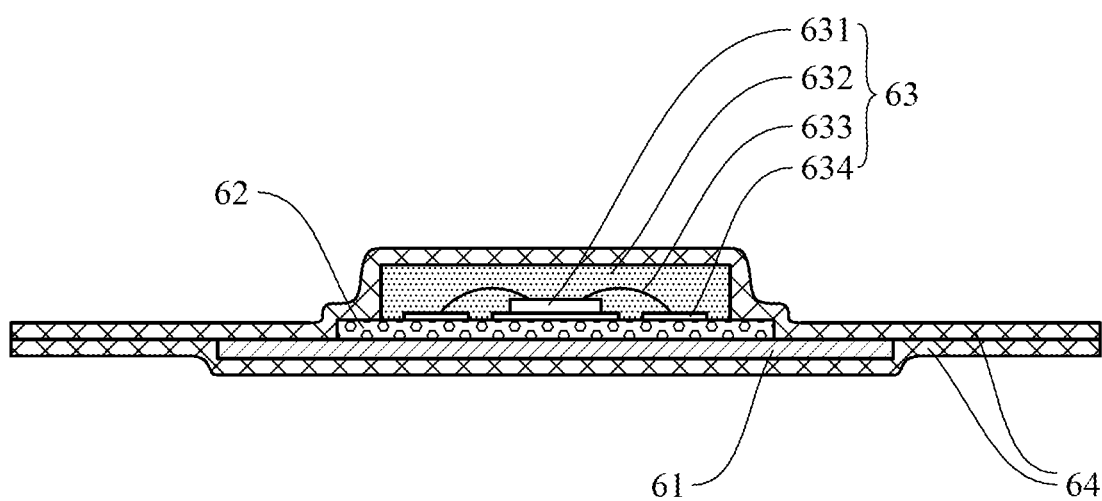
FIG. 7 is a side view of the second embodiment of the tag unit of the invention.

Please refer also to FIG. 7, which is a side view of the second embodiment of the tag unit of the present invention.

As shown in FIG. 7, the tag unit 60 includes a flexible circuit substrate 61 on which an antenna circuit 62 is provided, a chip package 63 electrically connected to the antenna circuit 62, and a circuit protection layer 64 provided on one side of the flexible circuit substrate 61 and one side of the chip package 63, respectively. In a preferred embodiment, the flexible circuit substrate 61 is elliptical or rectangular. The antenna circuit 62 is a loop antenna configured to match the properties of the chip package 63 on the flexible circuit substrate 61 (be it elliptical, rectangular, or otherwise) in the optimal manner so as to have enhanced sensitivity in signal reception.

The chip package 63 includes an IC chip 631 and an encapsulant 632 covering the IC chip 631. In a preferred embodiment, the IC chip 631 is electrically connected to the antenna circuit 62 via the leads 633 on a lead frame 634. The encapsulant 632 may be a thermosetting adhesive, a UV-curable adhesive, or resin. The encapsulant 632 protects the IC chip 631 and adds to the chip's strength against an external force by working with the flexible circuit substrate 61 to dampen any external force that acts directly on the IC chip 631.

The circuit protection layers 64 may be thermosetting polyimide or polyetherimide films or other electrically insulating materials that are resistant to high temperatures, acids, bases, and radiation. In a preferred embodiment, each circuit protection layer 64 has a thickness ranging from 1 mil to 5 mil.

The pliable protective layer 20 is provided on two opposite sides of the tag unit 60 to cover and thereby protect the tag unit 60. The pliable protective layer 20 may be a thermosetting polyimide or polyetherimide film or other electrically insulating materials that are resistant to high temperatures, acids, bases, and radiation. In a preferred embodiment, the pliable protective layer 20 has a thickness ranging from 1 mil to 5 mil.

The vulcanizable bonding layer 30 is provided on one or each of two opposite sides of the pliable protective layer 20 and can bond the tag unit 60 tightly to a tire through a vulcanization process. The vulcanizable bonding layer 30 is a material capable of a catalytic addition reaction, UV reaction, or condensation reaction to solve the problem that two totally different materials, namely the pliable protective layer 20 and a tire; cannot be bonded together with ease.

Figure 8:
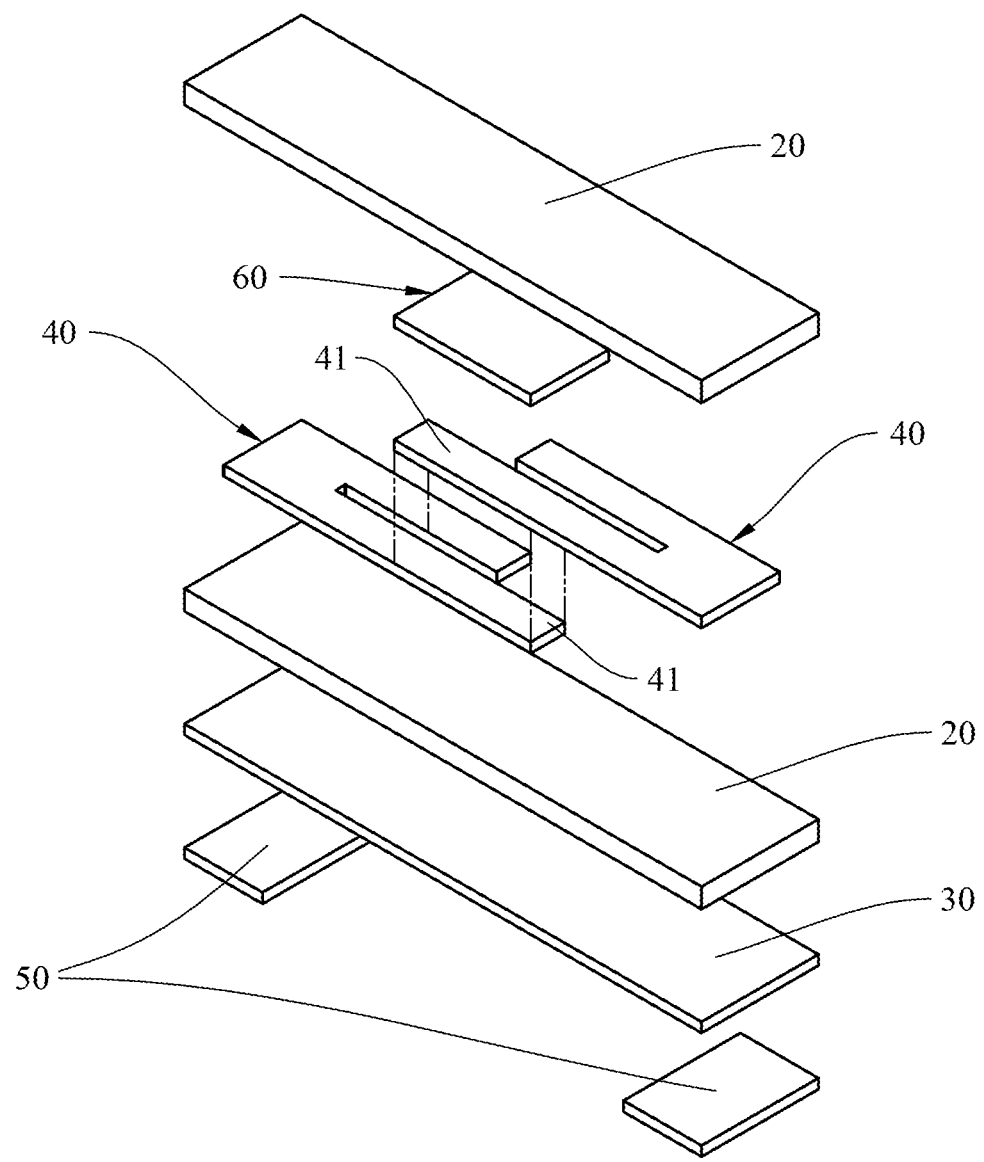
FIG. 8 is an exploded view of the UM tag in FIG. 5.

Please refer also to FIG. 8, which is an exploded view of the UID tag according to the second embodiment of the present invention.

In the preferred embodiment shown in FIG. 8, the tag unit 60 is provided with at least two partially overlapping signal amplification plates 40 on one side. The signal amplification plates 40 may be provided on either side (i.e., the upper or lower side) of the antenna circuit 62 of the tag unit 60; the relative positions of the signal amplification plates 40 and the antenna circuit 62 have no influence on the performance of the antenna circuit 62 in reading signals. The signal amplification plates 40 are designed according to the resonance frequency of the antenna so as to couple with signals of the antenna circuit 62 and amplify the signals by backscattering.

Each signal amplification plate 40 has a long arm 41 and a short arm that constitute a square hook shape. The two signal amplification plates 40 are arranged in a bilateral configuration like the form of mirror images of each other, with one long arm 41 stacked one the other. By reducing the overall length of each signal amplification plate 40, the chance of breaking the signal amplification plates 40 can be lowered to help the signal amplification plates 40 endure the vulcanization environment. Apart from the square hook shape disclosed herein, each signal amplification plate 40 may be shaped as a hollow square or the letter L instead; the present invention has no limitation in this regard. Furthermore, it is not required that there be two signal amplification plates 40 as shown in FIG. 8; more than two multilayer structures may be provided as the signal amplification plates. The present invention has no limitation on the number or configuration of the signal amplification plates. In a preferred embodiment, each signal amplification plate 40 is in the shape of a plate, a knitted web, a mesh, or a line.

In another preferred embodiment, the tag unit 60 is provided with only one signal amplification plate 40 on one side, wherein the signal amplification plate 40 is in the shape of a knitted web, a mesh, or a line. This signal amplification plate 40 may be provided on either side (i.e., the upper or lower side) of the antenna circuit 62 of the tag unit 60; the relative positions of the signal amplification plate 40 and the antenna circuit 62 have no influence on the performance of the antenna circuit 62 in reading signals.

The (or each) signal amplification plate 40 in the foregoing embodiments is 50 μm to 200 μm thick to provide the tag unit 60 with the rigidity required to resist an external force. In addition, the (or each) signal amplification plate 40 is made of a material that is highly resistant to corrosion and heat and has satisfactory low-temperature strength, mechanical properties, and hot-workability, such as stainless steel, a copper-nickel-zinc alloy, or tinplate. In a preferred embodiment, the signal amplification plates 40 are SUS 304-grade metal plates. The (or each) signal amplification plate 40 in the foregoing embodiments may be a metal plate or composite plate formed by weaving metal threads, etching (to form the desired circuit), cutting a metal sheet, coating a plastic substrate with silver paste, or electroplating or electrolessly plating a substrate. The present invention has no limitation on the material or manufacturing method of the signal amplification plate(s) 40.

One side of the vulcanizable bonding layer 30 is provided with a positioning adhesive layer 50 at each of two opposite ends so that the tag unit 60 can be properly positioned, or adhesively attached to a predetermined bonding position, on a tire via the positioning adhesive layers 50 before the bonding operation takes place. This pre-positioning process makes it easier to bond the tag unit 60 to the tire.

In summary, the UID tag for a tire of the present invention can resist the vulcanization process of the tire manufacturing process and the tire aging tests.

The above is the detailed description of the present invention. However, the above is merely the preferred embodiment of the present invention and cannot be the limitation to the implement scope of the present invention, which means the variation and modification according the present invention may still fall into the scope of the invention.

What is claimed is:

1. An unique ID electronic (UID) tag for a tire, comprising:
   a tag unit;
   a pliable protective layer provided on two opposite sides of the tag unit; and
   a vulcanizable bonding layer provided on one or each of the two opposite sides of the pliable protective layer to bond the UID tag tightly to the tire during a vulcanization process;
   wherein the tag unit comprises a circuit substrate provided with an antenna circuit, and an integrated circuit (IC) chip electrically connected to the antenna circuit, and the tag unit is provided with at least two partially overlapping signal amplification plates on one side.

2. The UID tag for a tire of claim 1, wherein the signal amplification plate has a long arm and a short arm that constitute a square hook shape; and, the two signal amplification plates are arranged in a bilateral configuration like the form of mirror images of each other, with one long arm stacked one the other.

3. The UID tag for a tire of claim 1, wherein the signal amplification plate is in the shape of a plate, a knitted web, a mesh, or a line.

4. The UID tag for a tire of claim 1, wherein the tag unit is provided with a signal amplification plate on one side.

5. The UID tag for a tire of claim 4, wherein the signal amplification plate is in the shape of a knitted web, a mesh, or a line.

6. The UID tag for a tire of claim 1, wherein the signal amplification plate is 50 μm to 200 μm thick.

7. The UID tag for a tire of claim 1, wherein the signal amplification plate is a metal plate or composite plate formed by weaving metal threads, etching circuit, cutting a metal sheet, coating a plastic substrate with silver paste, or electroplating or electrolessly plating a substrate.

8. The UID tag for a tire of claim 1, wherein the circuit substrate is disc-shaped or rectangular.

9. The UID tag for a tire of claim 1, wherein one side of the vulcanizable bonding layer is provided with a positioning adhesive layer at each of two opposite ends so that the tag unit is attached to a predetermined bonding position on a tire via the positioning adhesive layers.

10. An unique ID electronic (UID) tag for a tire, comprising:
    a tag unit;
    a pliable protective layer provided on two opposite sides of the tag unit; and
    a vulcanizable bonding layer provided on one or each of the two opposite sides of the pliable protective layer to bond the UID tag tightly to the tire during a vulcanization process;
    wherein the tag unit comprises a flexible circuit substrate on which an antenna circuit is provided, a chip package electrically connected to the antenna circuit, and a circuit protection layer provided on one side of the flexible circuit substrate and one side of the chip package, respectively, and the tag unit is provided with at least two partially overlapping signal amplification plates on one side.

11. The UID tag for a tire of claim 10, wherein the signal amplification plate has a long arm and a short arm that constitute a square hook shape; and, the two signal amplification plates are arranged in a bilateral configuration like the form of mirror images of each other, with one long arm stacked one the other.

12. The UID tag for a tire of claim 10, wherein the signal amplification plate is in the shape of a plate, a knitted web, a mesh, or a line.

13. The UID tag for a tire of claim 10, wherein the tag unit is provided with a signal amplification plate on one side.

14. The UID tag for a tire of claim 13, wherein the signal amplification plate is in the shape of a knitted web, a mesh, or a line.

15. The UID tag for a tire of claim 10, wherein the signal amplification plate is 50 μm to 200 μm thick.

16. The UID tag for a tire of claim 10, wherein the signal amplification plate is a metal plate or composite plate formed by weaving metal threads, etching circuit, cutting a metal sheet, coating a plastic substrate with silver paste, or electroplating or electrolessly plating a substrate.

17. The UID tag for a tire of claim 10, wherein one side of the vulcanizable bonding layer is provided with a positioning adhesive layer at each of two opposite ends so that the tag unit is attached to a predetermined bonding position on a tire via the positioning adhesive layers.

* * * * *